(12) United States Patent
Tanaka et al.

(10) Patent No.: US 11,326,381 B2
(45) Date of Patent: May 10, 2022

(54) WINDOW REGULATOR

(71) Applicant: Johnan Manufacturing Inc., Nagano (JP)

(72) Inventors: Shugo Tanaka, Nagano (JP); Tetsuya Kubota, Nagano (JP)

(73) Assignee: JOHNAN MANUFACTURING INC., Nagano (JP)

( * ) Notice: Subject to any disclaimer, the term of this patent is extended or adjusted under 35 U.S.C. 154(b) by 0 days.

(21) Appl. No.: 16/982,260

(22) PCT Filed: Mar. 12, 2019

(86) PCT No.: PCT/JP2019/010009
§ 371 (c)(1),
(2) Date: Sep. 18, 2020

(87) PCT Pub. No.: WO2019/188253
PCT Pub. Date: Oct. 3, 2019

(65) Prior Publication Data
US 2021/0054672 A1 Feb. 25, 2021

(30) Foreign Application Priority Data
Mar. 26, 2018 (JP) .............................. JP2018-058635

(51) Int. Cl.
*E05F 11/48* (2006.01)
*E05F 15/686* (2015.01)
(Continued)

(52) U.S. Cl.
CPC .............. *E05F 11/483* (2013.01); *B60J 1/17* (2013.01); *E05F 15/686* (2015.01);
(Continued)

(58) Field of Classification Search
CPC ..... E05F 11/483; E05F 11/486; E05F 15/686; E05F 15/689; E05F 15/697; B60J 1/17;
(Continued)

(56) References Cited

U.S. PATENT DOCUMENTS

| | | | | |
|---|---|---|---|---|
| 7,765,739 B2* | 8/2010 | Munezane | ............ | E05F 11/483 49/352 |
| 8,720,114 B2* | 5/2014 | Matsushita | ........... | E05F 11/486 49/352 |

(Continued)

FOREIGN PATENT DOCUMENTS

| | | |
|---|---|---|
| JP | 3117510 U | 1/2006 |
| JP | 3121045 U | 4/2006 |

(Continued)

OTHER PUBLICATIONS

Office Action issued in the corresponding Chinese Patent Application No. 201980022108.1 dated Jul. 6, 2021.

(Continued)

*Primary Examiner* — Jerry E Redman
(74) *Attorney, Agent, or Firm* — Roberts Calderon Safran & Cole P.C.

(57) ABSTRACT

A window regulator includes a guide rail provided along an ascending/descending direction of a window glass of a vehicle, a carrier plate that slides on the guide rail and travels together with the window glass, cables that pull the carrier plate, a drum on which the cables are partially wound, a motor rotationally driving the drum, and a drum housing provided at a lower end of the guide rail and having a housing space for housing the drum, wherein the drum housing has a wall section provided on an outer side of the drum that is housed in the housing space, and a contact surface of the drum housing coming into contact with the carrier plate is provided at a lower position than an upper (Continued)

end of the wall section in a vertical direction that the window glass travels when the window glass is fully opened.

9 Claims, 6 Drawing Sheets

(51) Int. Cl.
*E05F 15/697* (2015.01)
*B60J 1/17* (2006.01)

(52) U.S. Cl.
CPC ....... *E05F 15/697* (2015.01); *E05Y 2201/654* (2013.01); *E05Y 2900/55* (2013.01)

(58) Field of Classification Search
CPC ........... E05Y 2201/654; E05Y 2900/55; E05Y 2201/664
USPC .......................................................... 49/352
See application file for complete search history.

(56) References Cited

U.S. PATENT DOCUMENTS

| | | | |
|---|---|---|---|
| 9,650,825 B2* | 5/2017 | Tanaka | B60J 1/004 |
| 10,822,859 B2* | 11/2020 | Shiroma | E05F 11/486 |
| 10,927,588 B2* | 2/2021 | Kashiwabara | E05F 15/689 |
| 10,975,606 B2* | 4/2021 | Kashiwabara | E05D 15/165 |
| 2004/0154227 A1* | 8/2004 | Yoshimura | E05F 11/488 49/352 |
| 2006/0174542 A1* | 8/2006 | Bernard | E05F 11/485 49/352 |
| 2009/0145035 A1* | 6/2009 | Mangold | E05F 11/382 49/352 |
| 2014/0007507 A1* | 1/2014 | Umemura | E05F 11/486 49/349 |
| 2018/0112451 A1* | 4/2018 | Imaoka | E05D 15/165 |

FOREIGN PATENT DOCUMENTS

| | | |
|---|---|---|
| JP | 2010-112016 A | 5/2010 |
| JP | 2016-217090 A | 12/2016 |
| JP | 2018028183 A | 2/2018 |

OTHER PUBLICATIONS

International Preliminary Report on Patentability (Chapter I) issued in the corresponding Patent Application No. PCT/JP2019/010009 dated Oct. 8, 2020.
Decision to Grant a Patent issued in the corresponding Japanese Patent Application No. 2018-058635 dated Aug. 1, 2020.
Office Action issued in the corresponding Chinese Patent Application No. 201980022108.1 dated Dec. 8, 2021.

* cited by examiner

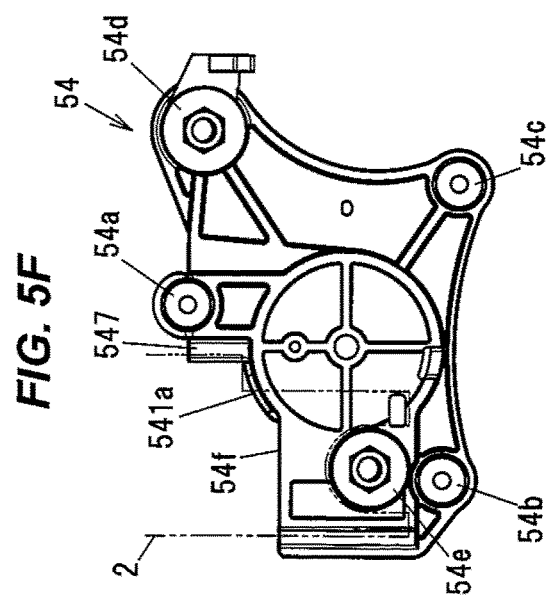
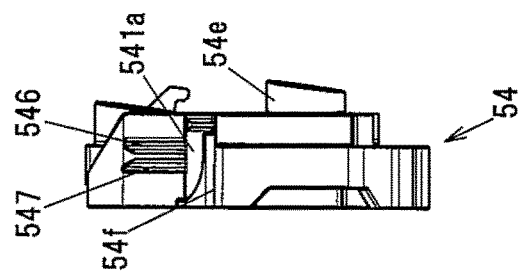
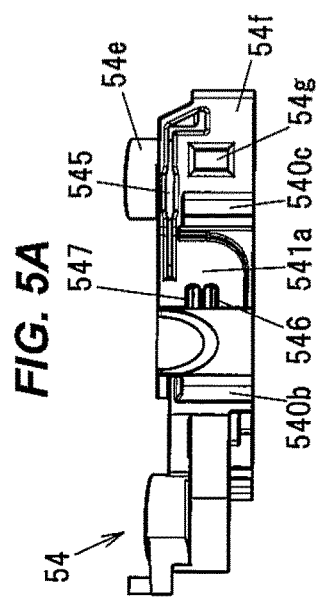
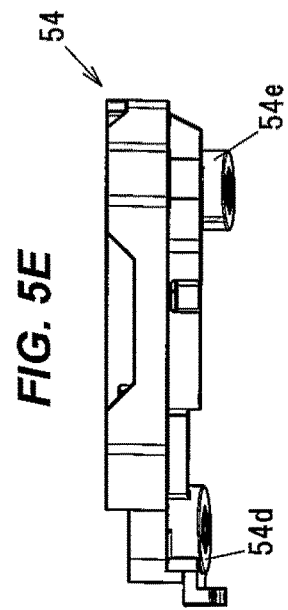
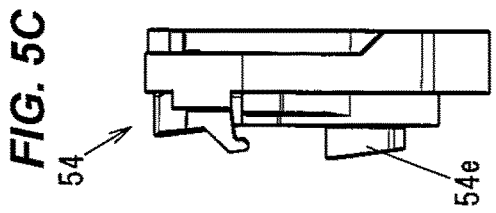

WINDOW REGULATOR

CROSS-REFERENCE TO RELATED APPLICATIONS

The present application is a U.S. National Phase of PCT/JP2019/010009 filed on Mar. 12, 2019 claiming priority to Japanese Patent Application No. 2018-058635 filed on Mar. 26, 2018. The disclosure of the PCT Application is hereby incorporated by reference into the present Application.

TECHNICAL FIELD

The present invention relates to a window regulator.

BACKGROUND ART

A window regulator is known, which is provided with a guide rail provided along an ascending/descending direction of a window glass of a vehicle, a carrier plate which slides on the guide rail and travels together with the window glass, cables which pull the carrier plate, a drum on which the cables are partially wound, a motor rotationally driving the drum, and a housing which is provided at a lower end of the guide rail and holds the motor and the drum (see, e.g., JP 2016/217090).

CITATION LIST

Patent Literature

JP 2016/217090

SUMMARY OF INVENTION

Technical Problem

In the window regulator described in JP 2016/217090, the motor and the housing are arranged at the lower end of the guide rail. Therefore, there is a problem that a dimension in a vertical direction in which the window glass travels is increased by a space for arranging the motor and the housing, in addition to a distance required for the window glass to travel on the guide rail.

It is an object of the invention to provide a window regulator which can be reduced in size in a travel direction of a window glass.

Solution to Problem

A window regulator in an embodiment of the invention is provided with a guide rail provided along an ascending/descending direction of a window glass of a vehicle, a carrier plate that slides on the guide rail and travels together with the window glass, cables that pull the carrier plate, a drum on which the cables are partially wound, a motor rotationally driving the drum, and a drum housing provided at a lower end of the guide rail and comprising a housing space for housing the drum, wherein the drum housing comprises a wall section provided on an outer side of the drum that is housed in the housing space, and a contact surface of the drum housing coming into contact with the carrier plate is provided at a lower position than an upper end of the wall section in a vertical direction that the window glass travels when the window glass is fully opened.

Advantageous Effects of Invention

According to an embodiment of the invention, it is possible to provide a window regulator which can be reduced in size in a travel direction of a window glass.

BRIEF DESCRIPTION OF DRAWINGS

FIG. 5A is a top view showing the configuration of the drum housing.

FIG. 5B is a front view showing the configuration of the drum housing.

FIG. 5C is a left side view showing the configuration of the drum housing.

FIG. 5D is a right side view showing the configuration of the drum housing.

FIG. 5E is a bottom view showing the configuration of the drum housing.

FIG. 5F is a back view showing the configuration of the drum housing.

DESCRIPTION OF EMBODIMENT

Short Summary of the Embodiment

Figure 1:
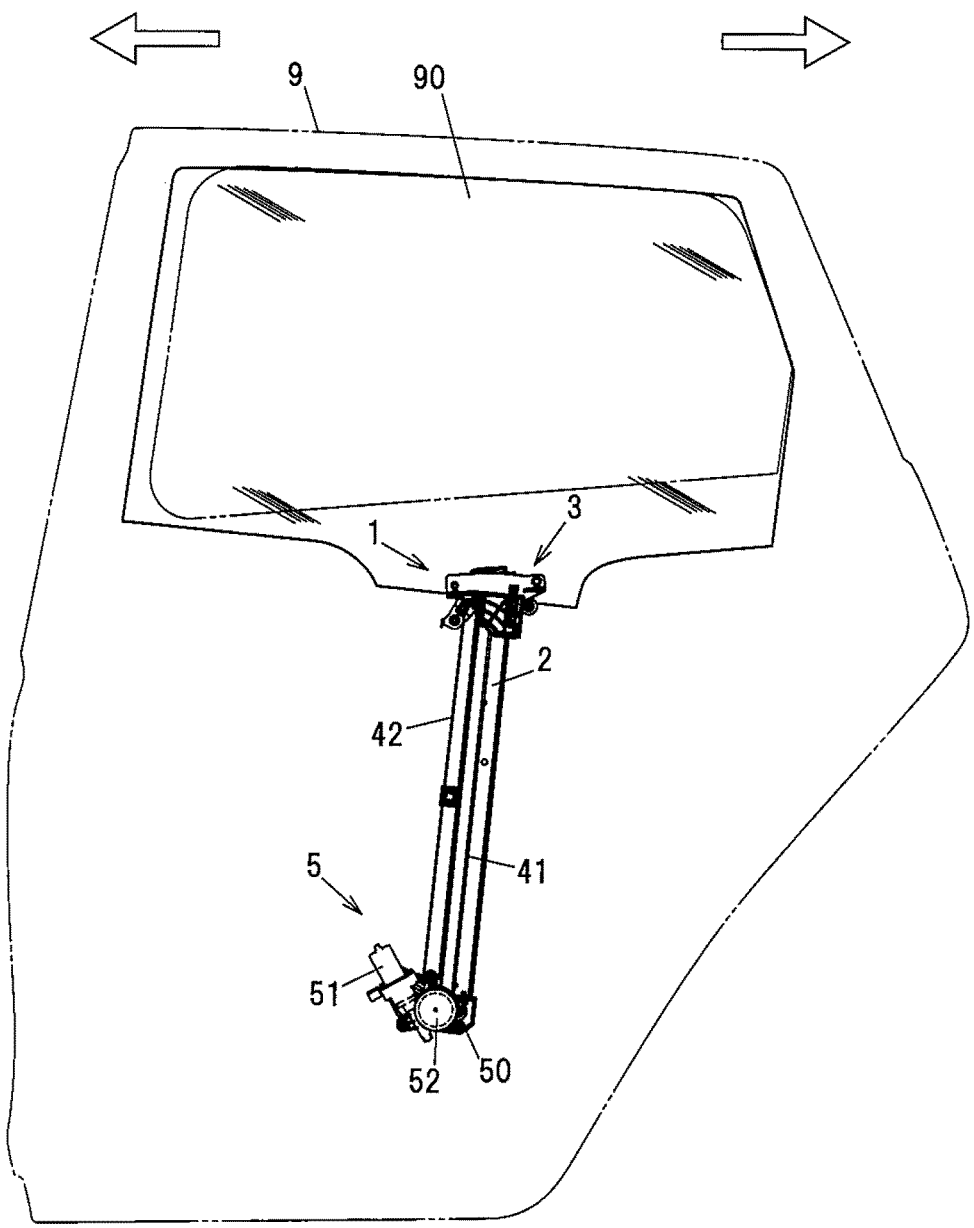
FIG. 1 is a general schematic diagram illustrating a window regulator in the present embodiment and a vehicle door mounting the window regulator.

A window regulator 1 in the present embodiment is provided with a guide rail 2 provided along an ascending/descending direction of a window glass 90 of a vehicle, a carrier plate 3 which slides on the guide rail 2 and travels together with the window glass 90, an ascending-side cable 41 and a descending-side cable 42 which pull the carrier plate 3, a drum 52 on which the ascending-side cable 41 and the descending-side cable 42 are partially wound, a motor 51 rotationally driving the drum 52, and a drum housing 54 provided at a lower end of the guide rail 2 and having a housing space 540 for housing the drum 52, wherein the drum housing 54 has a wall section 55 provided on an outer side of the drum 52 which is housed in the housing space 540, and a contact surface 54f of the drum housing 54 coming into contact with the carrier plate 3 is provided at a lower position than an upper end of the wall section 55 in a vertical direction in which the window glass 90 travels when the window glass 90 is fully opened.

In the window regulator 1, the motor and the drum can be provided at a higher position than when a contact surface of the drum housing coming into contact with the carrier plate is provided at a higher position than the upper end of the wall section in the vertical direction in which the window glass travels when the window glass is fully opened. Therefore, the vertical dimension of the window regulator is reduced. In other words, the size can be reduced in the travel direction of the window glass.

Embodiment

The window regulator 1 in the present embodiment is a device for raising and lowering the window glass 90 on a door 9 of, e.g., an automobile and is installed on a door panel of the automobile.

General Configuration of Window Regulator

Figure 2A:
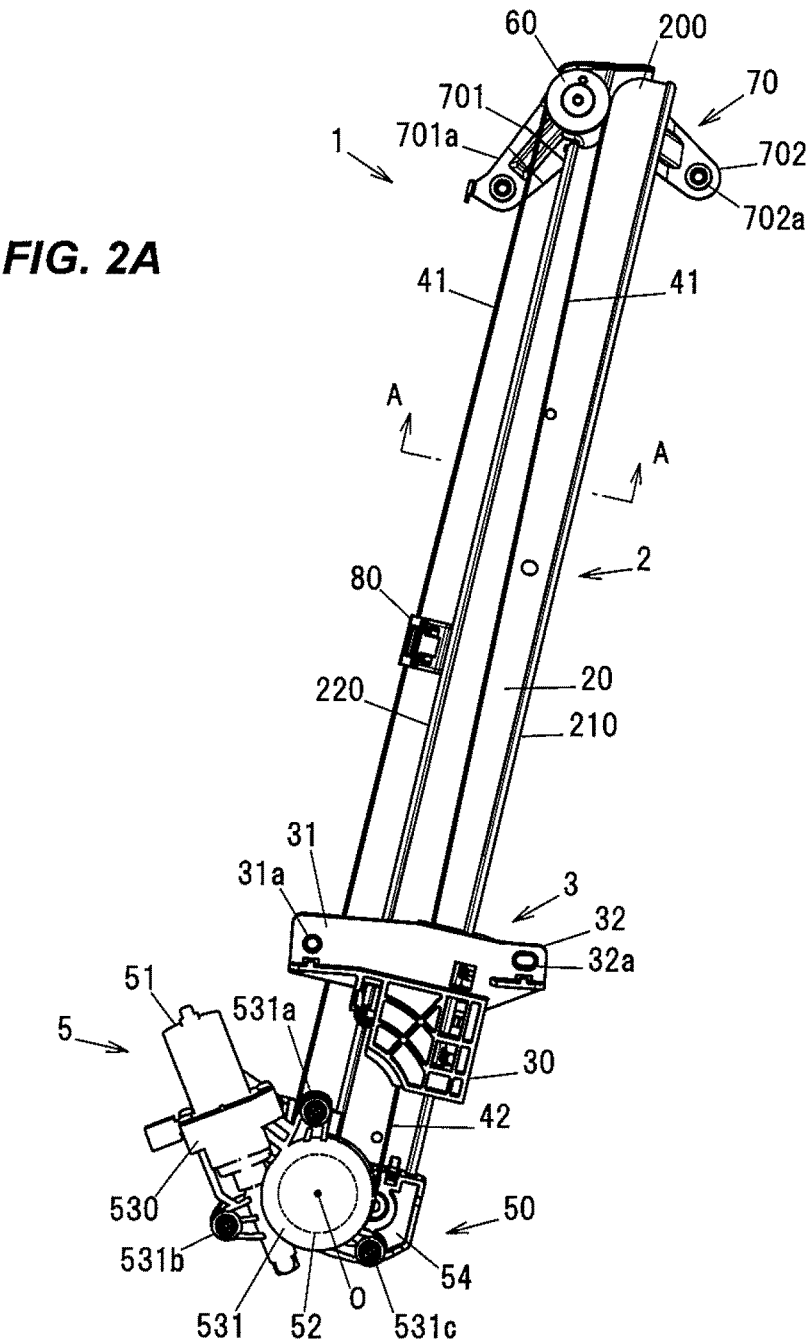
FIG. 2A is a front view showing a configuration of the window regulator in the present embodiment.
Figure 2B:
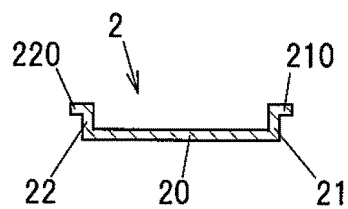
FIG. 2B is a cross sectional view taken along line A-A of FIG. 2A.
Figure 3:
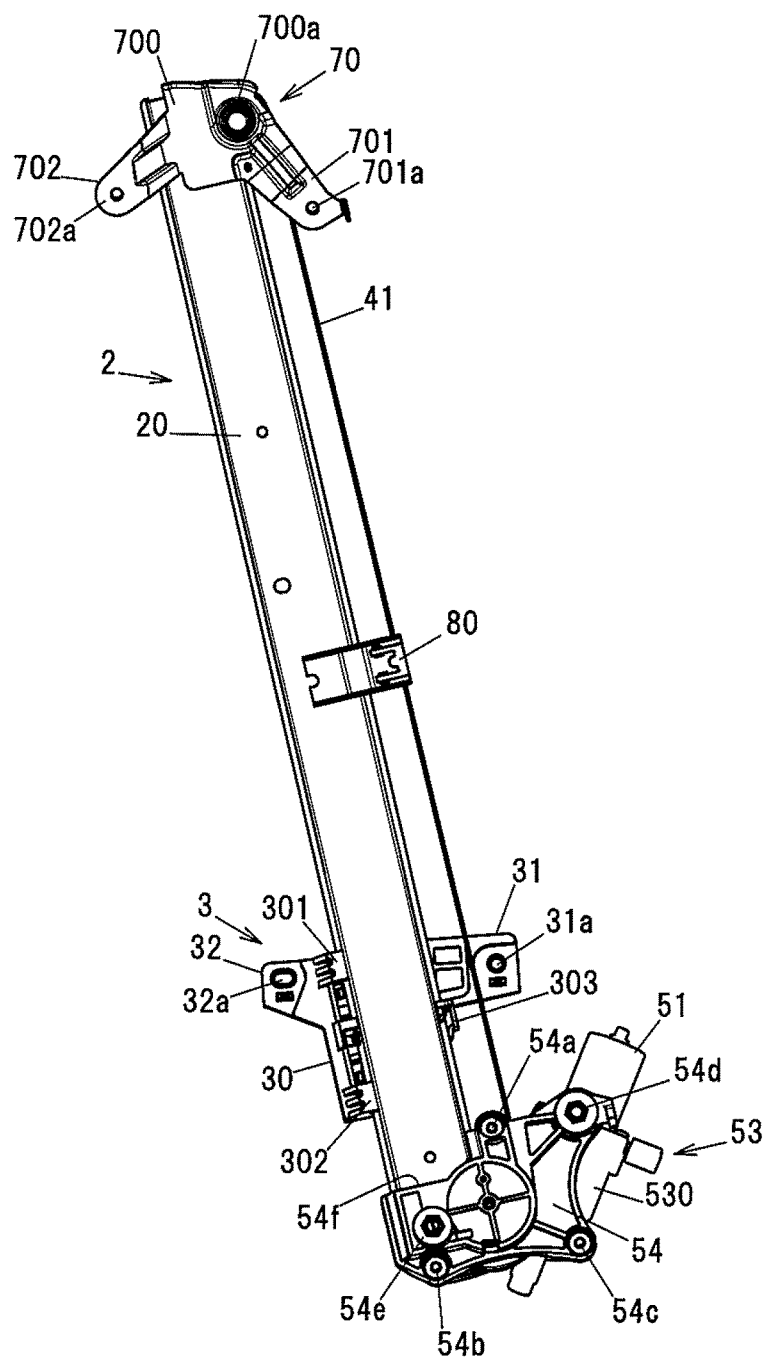
FIG. 3 is a back view showing the configuration of the window regulator in the present embodiment.

FIG. 1 is a general schematic diagram illustrating the window regulator 1 in the present embodiment and the door 9 of the vehicle mounting the window regulator 1. FIG. 2A is a front view showing a configuration of the window regulator in the present embodiment, and FIG. 2B is a cross sectional view taken along line A-A of FIG. 2A. FIG. 3 is a back view showing the configuration of the window regulator in the present embodiment. In FIG. 1, the window glass 90 is in a fully-closed state, and the door 9 and a window frame are indicated by phantom lines. In addition, in FIG. 1, the left side of the paper is defined as the front side in the vehicle longitudinal direction and the right side of the paper is defined as the rear side in the vehicle longitudinal direction. In the following description, a travel direction of the window glass 90 is simply referred to as "the vertical direction" (an arrow X shown in FIG. 6 described later).

As shown in FIG. 1, the window regulator 1 is generally configured to have the guide rail 2 which is housed in a door panel (not shown) provided on the door 9 of the vehicle and is provided along the ascending/descending direction of the window glass 90, the carrier plate 3 which slides on the guide rail 2 and travels together with the window glass 90, the ascending-side cable 41 and the descending-side cable 42 which pull the carrier plate 3, and a drive unit 5 which generates a driving force for taking up and feeding out the ascending-side cable 41 and the descending-side cable 42.

Configuration of Guide Rail

The guide rail 2 is a metal member formed by bending a long metal plate at a predetermined curvature and is arranged so as to tilt to the rear side in the vehicle longitudinal direction with respect to the door 9. As shown in FIG. 2B, the guide rail 2 integrally has a flat plate portion 20 extending in a longitudinal direction thereof, and first and second side plate portions 21 and 22 rising upright from both edges of the flat plate portion 20 in a width direction orthogonal to the longitudinal direction. First and second flange portions 210 and 220 are provided so as to respectively protrude from top end portions of the first and second side plate portions 21 and 22 toward a side opposite to the flat plate portion 20. In FIG. 2, the first and second side plate portions 21 and 22 protrude toward the near side of the paper.

Configuration of Carrier Plate 3

The carrier plate 3 is a plate-shaped member formed of, e.g., a resin such as polyacetal. The carrier plate 3 has a main body 30 locking one ends of the ascending-side cable 41 and the descending-side cable 42, and first and second coupling portions 31 and 32 protruding from the main body 30 in the vehicle longitudinal direction and coupled to the window glass 90. Attachment holes 31a and 32a to which a coupling member (not shown) for coupling to the window glass 90 is attached are respectively formed on the first and second coupling portions 31 and 32.

As shown in FIG. 3, first to third sliding portions 301 to 303 which slide on the first and second side plate portions 21 and 22 of the guide rail 2 are provided on the main body 30 of the carrier plate 3. The first and second sliding portions 301 and 302 slide on the first side plate portion 21 of the guide rail 2, and the third sliding portion 303 slides on the second side plate portion 22 of the guide rail 2.

Configuration of Ascending-Side Cable and Descending-Side Cable

The ascending-side cable 41 is coupled to the carrier plate 3 at one end, turns at a pulley 60 arranged at an upper end of the guide rail 2, and is coupled to the drum 52 of the drive unit 5 (described later) at the other end. The descending-side cable 42 is coupled to the carrier plate 3 at one end and is coupled to the drum 52 at the other end. The ascending-side cable 41 routed between the pulley 60 and the drum 52 is supported by a cable support portion 80 provided at a longitudinal center of the guide rail 2. Abnormal noise caused by vibration of the ascending-side cable 41 is thereby prevented.

The pulley 60 is shaft-supported on a pulley bracket 70 which is fixed to the upper end of the guide rail 2. The pulley bracket 70 is a metal member and has a center portion 700 rotatably supporting the pulley 60, and first and second panel fixing portions 701 and 702 formed to extend respectively from both edges of the center portion 700. Fixing holes 701a and 702a for fixing the pulley bracket 70 to the door panel are respectively formed on the first and second panel fixing portions 701 and 702.

The pulley 60 is arranged in the vicinity of an end portion 200 formed by cutting out the flat plate portion 20 of the guide rail 2 in the vehicle longitudinal direction. The end portion 200 of the guide rail 2 is an end portion on the upper end side in the longitudinal direction of the guide rail and is formed so that a dimension in a direction orthogonal to the longitudinal direction of the guide rail is smaller than the flat plate portion 20. The pulley 60 is aligned with the end portion 200 of the guide rail 2 in the vehicle longitudinal direction. This allows the dimension of the window regulator 1 in the vertical direction to be reduced as compared to when the pulley 60 is arranged above the guide rail 2.

Configuration of Drive Unit

As shown in FIGS. 2A and 3, the drive unit 5 has the motor 51 with reducer, the columnar drum 52 (indicated by a dashed line in FIG. 2A) which is rotationally driven by the motor 51 and takes up and feeds out the ascending-side cable 41 and the descending-side cable 42 by rotating, and a housing 50 which is provided at the lower end of the guide rail 2 and is composed of a motor housing 53 holding the motor 51 and the drum housing 54 fixed to the motor housing 53 and accommodating the drum 52.

The motor 51 is held by a motor holding portion 530 of the motor housing 53 (described later) and is inclined by a predetermined angle about a rotational axis O of the drum 52. A reduction gear constructed from a worm wheel, etc., is coupled to and meshes with an output shaft of the motor 51, and a portion of the reduction gear is housed in the motor holding portion 530 of the motor housing 53.

The motor housing 53 integrally has the motor holding portion 530 holding the motor 51 and the reducer, and a drum cover portion 531 covering an opening of the drum housing 54. First to third fastening portions 531a to 531c for fastening the motor housing 53 to the drum housing 54 are provided on the drum cover portion 531. Fastening members, e.g., bolts and nuts, etc., are attached to the first to third fastening portions 531a to 531c.

Details of Drum Housing

Figure 4:
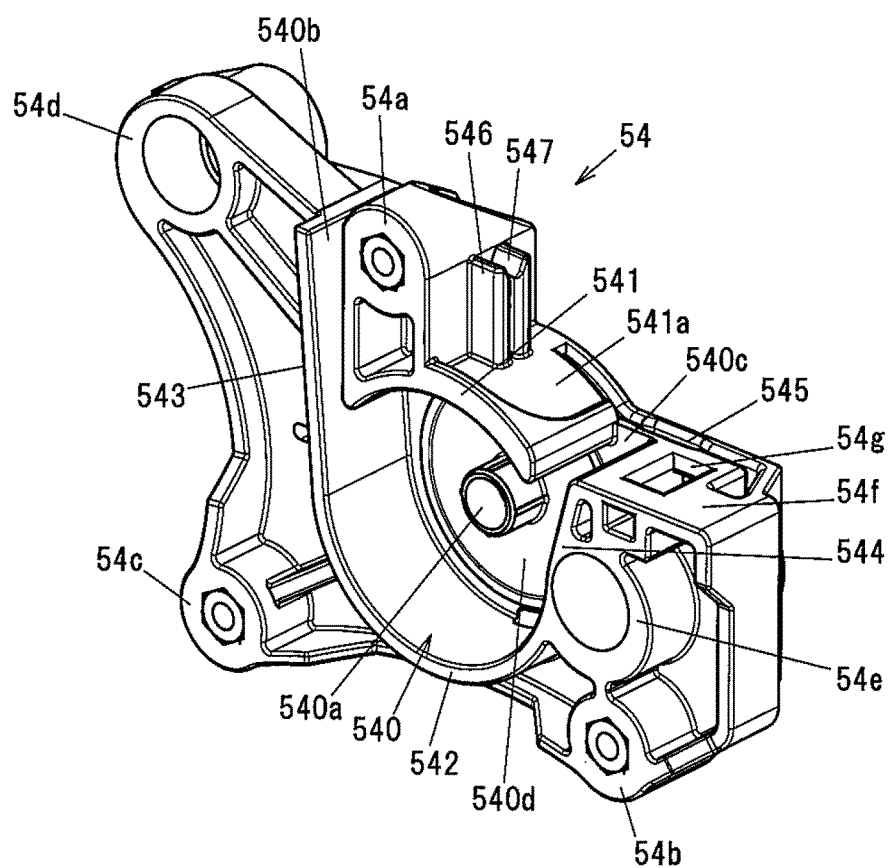
FIG. 4 is a perspective view showing a configuration of a drum housing.

The drum housing 54 will be described in detail in reference to FIGS. 4 and 5. FIG. 4 is a perspective view showing an example configuration of the drum housing 54. FIGS. 5A to 5F are plan views showing the configuration of the drum housing 54, wherein FIG. 5A is a top view, FIG. 5B is a front view, FIG. 5C is a left side view, FIG. 5D is a right side view, FIG. 5E is a bottom view and FIG. 5F is a back view. In FIGS. 5B and 5F, the guide rail 2 is indicated by a phantom line.

The drum housing 54 is provided at the lower end of the guide rail 2 and has the housing space 540 for housing the drum 52 and the wall section 55 provided on an outer side of the drum 52 which is housed in the housing space 540. The wall section 55 is provided to rise up in a direction of the rotational axis O from an outer rim of a contacting surface 540d at which the drum 52 housed in the housing space 540 is in contact with the drum housing 54 in the direction of the rotational axis O. In addition, the wall section 55 covers the outer circumferential surface of the drum 52. A shaft portion 540a rotatably supporting the drum 52 is provided in the housing space 540. The shaft portion 540a protrudes from the contacting surface 540d toward the opening.

As shown in FIG. 5B, the wall section 55 of the drum housing 54 integrally has an upper wall 541 located above the housing space 540 in the vertical direction, a lower wall 542 located below the housing space 540 in the vertical direction, and first and second side walls 543 and 544 located on both sides of the housing space 540 in a direction orthogonal to the vertical direction.

The upper wall 541, when viewed in the direction of the rotational axis O of the drum 52, has an arc shape which curves so as to bulge upward in the vertical direction. The lower wall 542, when viewed in the direction of the rotational axis O of the drum 52, has an arc shape which curves so as to bulge downward in the vertical direction.

The lower wall 542 has an arc shape centered about the rotational axis O of the drum 52, the first side wall 543 is formed to linearly extend from one circumferential end of the lower wall 542, and the second side wall 544 is formed to linearly extend from the other circumferential end of the lower wall 542.

An ascending-side lead-out groove 540b for the ascending-side cable 41 wound on the drum 52 to extend out is formed between the upper wall 541 and the first side wall 543. Likewise, a descending-side lead-out groove 540c for the descending-side cable 42 wound on the drum 52 to extend out is formed between the upper wall 541 and the second side wall 544. The ascending-side lead-out groove 540b and the descending-side lead-out groove 540c are in communication with the housing space 540 and open on the upper side as well as on the front side.

The upper wall 541 and the lower wall 542 are wall sections which are provided around an outer periphery of the drum 52 and form a substantially annular shape via the ascending-side lead-out groove 540b and the descending-side lead-out groove 540c. In the present embodiment, the upper wall 541 and the lower wall 542 are provided along the outer periphery of the drum 52. The upper wall 541 has a plate shape having a predetermined thickness in the radial direction of the drum 52. A thickness T of the upper wall 541 is, e.g., 2 to 5 mm (see FIG. 6 described later)).

The flat contact surface 54f is formed on the drum housing 54 and comes into contact with a bottom surface 30a (see FIG. 6) of the carrier plate 3 at a position where the carrier plate 3 is located when the window glass 90 is in a fully-opened state (hereinafter, this position is referred to as "the lowermost position"). The contact surface 54f is located on the descending-side lead-out groove 540c side relative to the housing space 540 and is located at a lower position than an outer surface 541a of the upper wall 541.

A rectangular attachment hole 54g having a depth in the vertical direction is formed on the contact surface 54f of the drum housing 54. An elastic body 548 for cushioning an impact caused by coming into contact the carrier plate 3 is arranged in the attachment hole 54g (see FIG. 6).

First to third fixing portions 54a to 54c to which the first to third fastening portions 531a to 531c of the motor housing 53 are respectively fixed are provided on the drum housing 54. The first to third fixing portions 54a to 54c are arranged at positions surrounding the housing space 540 in such a manner that a triangle is formed when connecting the respective center points. The first fixing portion 54a is located on the upper side relative to the housing space 540 and the second and third fixing portions 54b and 54c are located on the lower side relative to the housing space 540.

As shown in FIG. 5A, a fitting hole 545 to which the lower end of the guide rail 2 is fitted is formed on the drum housing 54. The fitting hole 545 is located on the back surface side relative to the housing space 540. First and second support walls 546 and 547 for supporting the second flange portions 220 of the guide rail 2 are also provided on the drum housing 54 so as to extend upward from the outer surface 541a of the upper wall 541.

The first and second support walls 546 and 547 face each other in the direction of the rotational axis O via a gap, and the second flange portions 220 of the guide rail 2 is housed in the gap and is sandwiched between the first and second support walls 546 and 547.

When the drum housing 54 is viewed in the vehicle width direction, at least a portion of the guide rail 2 fitted in the fitting hole 545 is provided at a position overlapping the descending-side lead-out groove 540c and the housing space 540. Since the guide rail 2 in the present embodiment is located over the descending-side lead-out groove 540c of the drum housing 54, rigidity of the guide rail 2 is improved. Here, a depth d of the fitting hole 545 in the vertical direction is, e.g., 32 mm.

Figure 6:
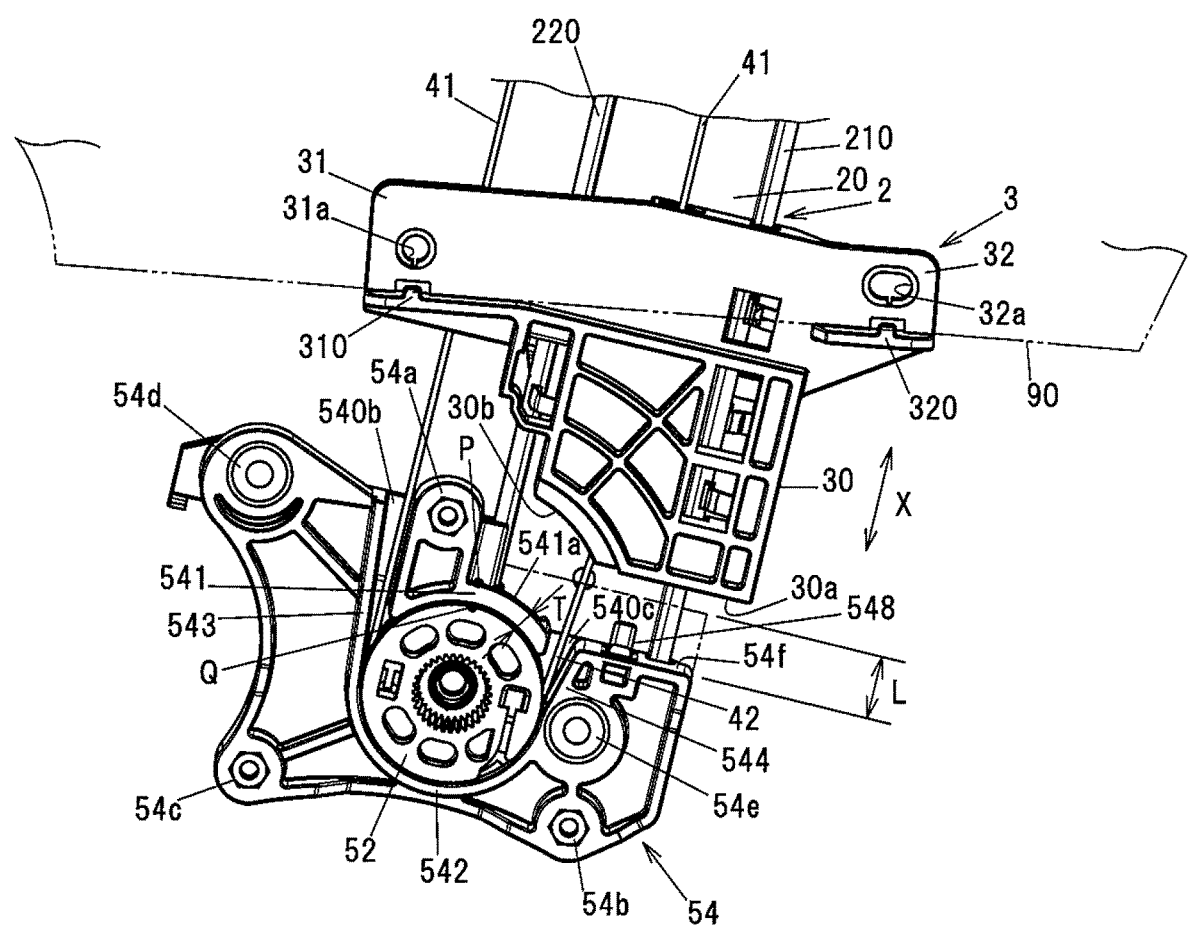
FIG. 6 is an enlarged view showing the drum housing, and the periphery thereof, of the window regulator showing in FIG. 2A.

Next, the details of the carrier plate 3 and the functions and effects of the invention will be described in reference to FIG. 6. FIG. 6 is an enlarged view showing the drum housing, and the periphery thereof, of the window regulator showing in FIG. 2A. In FIG. 6, the window glass 90 and a portion of the shape of a conventional drum housing A are indicated by phantom lines.

Details of Carrier Plate 3

As shown in FIG. 6, the bottom surface 30a of the main body 30 of the carrier plate 3 is a flat surface which is in contact with the contact surface 54f of the drum housing 54 when the carrier plate 3 is located at the lowermost position. In addition, first and second holding walls 310 and 320 which hold the window glass 90 in the vertical direction are also provided on the carrier plate 3. The first holding wall 310 is arranged below the attachment hole 31a of the first coupling portion 31, and the second holding wall 320 is arranged below the attachment hole 32a of the second coupling portion 32.

The carrier plate 3 has a facing surface 30b which faces the outer surface 541a of the upper wall 541 of the wall section 55 of the drum housing 54 when the window glass 90 is fully opened. The facing surface 30b has an arc shape along the outer surface 541a of the upper wall 541 of the wall section 55. This certainly provides a travel distance required for the carrier plate 3 and the window glass 90 to travel. The travel distance here is a distance required to change the state of the window glass 90 from the fully-closed state to the fully-opened state.

In detail, when the carrier plate 3 is configured that its facing surface facing the outer surface 541a of the upper wall 541 of the drum housing 54 does not have a shape along the outer surface 541a of the upper wall 541, the carrier plate 3 collides with the upper wall 541 of the drum housing 54 before the bottom surface 30a of the carrier plate 3 comes into contact with the contact surface 54f of the drum housing 54 and the carrier plate 3 cannot travel to the lowermost position, causing a problem that the window glass 90 cannot be fully opened. Therefore, in the present embodiment, by configuring the carrier plate 3 so that a surface facing the upper wall 541 of the drum housing 54 has a shape along the outer surface 541a of the upper wall 541, the above-mentioned collision of the carrier plate 3 with the drum housing 54 is avoided and the travel distance of the window glass 90 and the carrier plate 3 is certainly provided. This configuration also contributes to reduction in size and weight of the carrier plate 3.

However, the shape of the facing surface 30b of the carrier plate 3 is not limited to that described above as long as it is a shape along the outer surface of the upper wall 541 of the drum housing 54. That is, when the outer surface of the upper wall 541 of the drum housing 54 is flat, the facing surface of the carrier plate 3 may be flat.

When the carrier plate 3 comes into contact with the drum housing 54 at the lowermost position of the carrier plate 3, the elastic body 548 is squashed by the bottom surface 30a of the carrier plate 3, and the bottom surface 30a of the carrier plate 3 then comes into contact with the contact surface 54f of the drum housing 54. In this regard, a surface of the elastic body 548 which comes into contact with the carrier plate 3 is also included in "the contact surface of the drum housing coming into contact with the carrier plate" of the invention. In other words, even when the elastic body 548 is not completely squashed by the bottom surface 30a of the carrier plate 3 and the contact surface 54f except the elastic body 548 is not in contact with the bottom surface 30a of the carrier plate 3, the contact surface 54f of the drum housing 54 is regarded as being in contact with the carrier plate 3.

Functions and Effects

The contact surface 54f of the drum housing 54, which comes into contact with the carrier plate 3 when the carrier plate 3 reaches its lowermost position and the window glass 90 is fully opened, is provided at a lower position than the upper end of the wall section 55 in the vertical direction X. In more detail, the contact surface 54f of the drum housing 54 is located at a lower position than the outer surface 541a of the upper wall 541 of the wall section 55.

In other words, the outer surface 541a of the upper wall 541 of the drum housing 54 is located at a higher position than the contact surface 54f of the drum housing 54. That is, in the present embodiment, the positions of the motor 51 and the drum 52 in the drum housing 54 are higher than the conventional window regulator described in JP 2016/217090. This realizes reduction in dimension of the window regulator 1 in the travel direction.

"The contact surface 54f of the drum housing 54 is provided at a lower position than the outer surface 541a of the upper wall 541 in the vertical direction X" here means that the position of the contact surface 54f is at least lower in the vertical direction X than a peak P of the outer surface 541a which is the highest point in the circumferential direction. In this regard, the position of the contact surface 54f is at least lower in the vertical direction X than a peak Q which is on the inner surface of the upper wall 541 facing the outer circumferential surface of the drum 52 and is the highest point in the circumferential direction.

Next, the effects of the invention will be described in comparison with the conventional drum housing A. The conventional drum housing A has the same configuration as the drum housing 54 in the present embodiment, except that the contact surface coming into contact with the carrier plate 3 is located higher than the outer surface 541a of the upper wall 541.

In case of the conventional drum housing A, the carrier plate 3 comes into contact with the drum housing at a distance L higher than the contact surface 54f of the drum housing 54 in the present embodiment. The distance L here is a vertical distance between the contact surface 54f of the drum housing 54 and a surface of the conventional drum housing A coming into contact with the carrier plate 3.

Then, since the travel distance of the window glass 90 is a fixed value preset for each vehicle, the length of the guide rail 2 needs to be increased by the distance L to certainly provide the travel distance of the window glass 90. In other words, in the present embodiment, the dimension of the window regulator 1 in the travel direction is reduced by configuring that the contact surface 54f is located at a lower position than the outer surface 541a of the upper wall 541 of the wall section 55.

As described above, in the present embodiment, it is possible to reduce the size of the window regulator 1 in the travel direction since the contact surface 54f of the drum housing 54, which comes into contact with the carrier plate 3 when the carrier plate 3 reaches the lowermost position and the window glass 90 is fully opened, is located at a lower position than the upper end of the wall section 55 in the vertical direction X.

Although the outer surface 541a of the upper wall 541 has an arc shape along the outer periphery of the drum 52 in the present embodiment, the shape of the outer surface of the upper wall 541 is not limited thereto and may be, e.g., flat.

Although the embodiment of the invention has been described, the invention according to claims is not to be limited to the embodiment. Further, please note that all combinations of the features described in the embodiment are not necessary to solve the problem of the invention. The invention can be appropriately modified and implemented without departing from the gist thereof.

In the present embodiment, reducing the size of the window regulator 1 in the travel direction of the window glass also contributes to improvement in attachability at the time of attaching the window regulator 1 inside the door panel of the vehicle. In more detail, the inside space of the door panel in which the window regulator 1 is housed is generally predetermined according to the layout of the vehicle, and how to set the window regulator 1 in such a limited space is a major challenge.

Particularly a so-called lower end drive-type window regulator, in which a motor and a drum are arranged at a lower end of a guide rail, requires a space in a longitudinal direction of a window glass. Furthermore, since a gap required for attachment work also needs to be provided between the lower end portion of the window regulator and the bottom surface of the door panel, reduction in dimension of the window regulator in the travel direction of the window glass is an important issue.

The dimension of the window regulator in the travel direction of the window glass is roughly determined by the travel distance of the window glass, the size of the carrier plate, and the sizes of the motor and the housing. Therefore, the above-mentioned issue can be solved also by reducing the size of the carrier plate. However, ability to hold the window glass may be reduced by reducing the size of the carrier plate, resulting in unstable travel of the window glass.

Based on this, the inventors of the present invention focused on the arrangement of the motor and the drum in the housing and solved the above-mentioned issue. That is, by configuring that the outer surface 541a of the upper wall 541 of the drum housing 54 is located at a higher position than the contact surface 54f coming into contact with the carrier plate 3, it is possible to reduce the size of the window regulator 1 in the travel direction of the window glass 90 while maintaining the travel distance of the window glass 90.

REFERENCE SIGNS LIST

1: window regulator
2: guide rail
3: carrier plate
5: drive unit
9: door
20: flat plate portion
21: first side plate portion
22: second side plate portion
80: cable support portion
30: main body
30a: bottom surface
30b: facing surface
41: ascending-side cable
42: descending-side cable
50: housing
51: motor
52: drum
53: motor housing
54: drum housing
54f: contact surface
55: wall section
90: window glass
200: end portion
540: housing space
541: upper wall
541a: outer surface
542: lower wall
543: first side wall
544: second side wall
545: fitting hole
548: elastic body

The invention claimed is:

1. A window regulator, comprising:
a guide rail provided along an ascending/descending direction of a window glass of a vehicle;
a carrier plate that slides on the guide rail and travels together with the window glass;
cables that pull the carrier plate;
a drum on which the cables are partially wound;
a motor rotationally driving the drum; and
a drum housing provided at a lower end of the guide rail and comprising a housing space for housing the drum,
wherein the drum housing comprises a wall section covering an outer periphery of the drum that is housed in the housing space, and a contact surface of the drum housing coming into contact with the carrier plate is provided at an upper end of inner surface of the wall section in a vertical direction that the window glass travels when the window glass is fully opened.

2. The window regulator according to claim 1, wherein a fitting hole for fitting the lower end of the guide rail and a descending-side lead-out groove for the cable to extend out are formed on the drum housing, and at least a portion of the guide rail fitted to the fitting hole is located over the descending-side lead-out groove when the drum housing is viewed in a width direction of the vehicle.

3. A window regulator, comprising:
a guide rail provided along an ascending/descending direction of a window glass of a vehicle;
a carrier plate that slides on the guide rail and travels together with the window glass;
cables that pull the carrier plate;
a drum on which the cables are partially wound;
a motor rotationally driving the drum; and
a drum housing provided at a lower end of the guide rail and comprising a housing space for housing the drum,
wherein the drum housing comprises a wall section covering an outer periphery of the drum that is housed in the housing space, the wall section is provided to rise up in a rotational axis direction of the drum from a contacting surface at which the drum housed in the housing space is in contact with the drum housing in the rotational axis direction of the drum, and a contact surface of the drum housing coming into contact with the carrier plate is provided at a lower position than an upper end of inner surface of the wall section in a vertical direction that the window glass travels when the window glass is fully opened.

4. A window regulator, comprising:
a guide rail provided along an ascending/descending direction of a window glass of a vehicle;
a carrier plate that slides on the guide rail and travels together with the window glass;
a drum that rotates; and
a drum housing provided at a lower end of the guide rail and comprising a housing space for housing the drum,
wherein the drum housing comprises a wall section covering an outer periphery of the drum that is housed in the housing space, the wall section is provided to rise up in a rotational axis direction of the drum from a contacting surface at which the drum housed in the housing space is in contact with the drum housing in the rotational axis direction of the drum, and a contact surface of the drum housing coming into contact with the carrier plate is provided at a lower position than an upper end of inner surface of the wall section in a vertical direction that the window glass travels when the window glass is fully opened.

5. The window regulator according to claim 1, wherein the carrier plate comprises a facing surface that faces an outer surface of the wall section of the drum housing when the window glass is fully opened, and the facing surface has a shape along the outer surface of the wall section.

6. The window regulator according to claim 2, wherein the carrier plate comprises a facing surface that faces an outer surface of the wall section of the drum housing when the window glass is fully opened, and the facing surface has a shape along the outer surface of the wall section.

7. The window regulator according to claim 1, wherein the wall section has a plate shape having a predetermined thickness in a radial direction of the drum.

8. The window regulator according to claim 2, wherein the wall section has a plate shape having a predetermined thickness in a radial direction of the drum.

9. The window regulator according to claim 5, wherein the wall section has a plate shape having a predetermined thickness in a radial direction of the drum.

* * * * *